April 22, 1952  L. G. KRUG  2,593,899
SEAL
Filed March 11, 1946
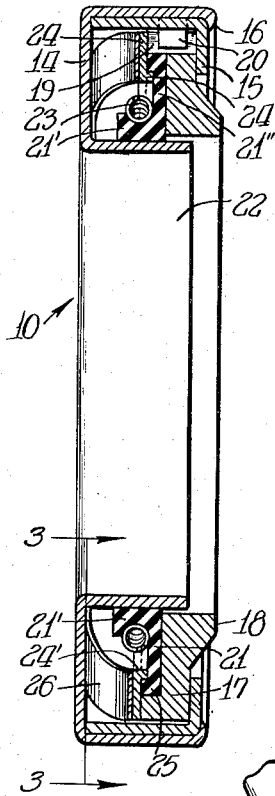
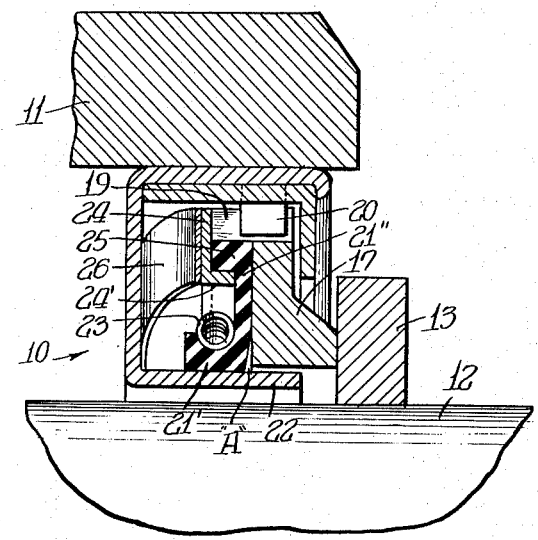
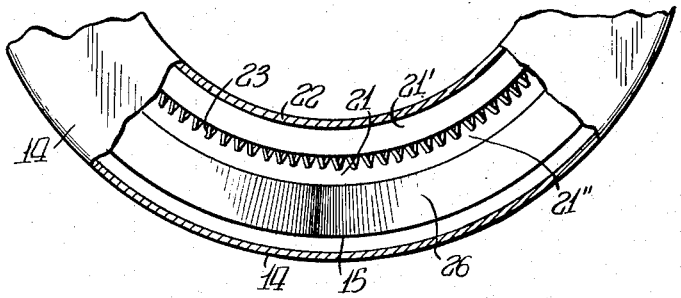
Fig. 1
Fig. 2
Fig. 3
INVENTOR.
Louis G. Krug
BY
Cromwell, Greist & Warden
ATTORNEYS

Patented Apr. 22, 1952

2,593,899

UNITED STATES PATENT OFFICE 2,593,899

SEAL

Louis G. Krug, Chicago, Ill., assignor to Chicago Rawhide Manufacturing Company, Chicago, Ill., a corporation of Illinois Application March 11, 1946, Serial No. 653,642

2 Claims. (Cl. 288—3)

This invention relates to improvements in a shaft seal of the self-contained type intended to prevent fluid leakage or admission of dirt or foreign matter between two relatively rotatable parts, such as a shaft and housing.

It is the object of the invention to provide a self-contained seal including portions engageable with two such relatively rotatable members, one of said portions having running sealing engagement with one of the members and the other portion normally having a relatively fixed engagement with the other member, although capable of some axial motion relative thereto in the operation of the seal, said seal having provisions whereby the effectiveness of its operation is not destroyed or impaired in the event said relative movement is prevented.

A further and more specific object is to provide a self-contained seal including a housing and an inner, annular, diaphragm-type sealing element of flexible material which has a peripheral portion in a normally relatively fixed, constrictive sealing engagement with the housing and a radially extending portion which axially abuts a further face sealing member, said radially extending portion being resiliently sustained in the axial direction in a manner to readily accommodate axial shifting of said face sealing member in operation, while maintaining an unbroken seal at the abutting surfaces, regardless of whether relative axial shifting takes place at said point of constrictive sealing engagement or is interrupted by freezing of the seal to the housing at said point.

The foregoing statements are indicative in a general way of the nature of the invention, but other and more specific objects will be apparent to those skilled in the art upon a full understanding of the construction and operation of the device.

One embodiment of the invention is presented herein for purpose of exemplification, but it will be appreciated that the invention is capable of incorporation in other modified forms coming equally within the scope of the appended claims.

In the drawings,

Fig. 1 is a view in axial section through a seal embodying the present invention;

Fig. 2 is an enlarged fragmentary view, further illustrating the seal in the operative assembled relation thereof to a pair of relatively rotatable members; and Fig. 3 is a fragmentary rear view partially broken away and in section on a line corresponding to line 3—3 of Fig. 1, further illustrating details of the seal construction.

This invention relates to a self-contained shaft seal of a generally well known type and incorporates a diaphragm-type flexible sealing member having radial or constrictive sealing engagement at a peripheral surface thereof with an internal member or re-entrant sleeve-like flange of the seal, without relative rotation in the normal operation of the seal. A limited amount of relative axial movement ordinarily takes place between said sealing member and flange during the normal sealing operation. It is the main purpose of this invention to afford an assembly which, while it permits said relative axial movement in normal circumstances, also is constructed and arranged whereby the effectiveness of operation of the seal is not objectionably impaired if said relative axial movement at the housing flange should be prevented, as by "freezing" of the flange engaging portion of the sealing member in operation. It frequently occurs that flexible diaphragm elements, particularly if fabricated of synthetic rubber, tend to "grow" or swell in use, causing excessively tight gripping of a part engaged thereby and thus tending to immobilize the diaphragm. Should such "freezing" and resultant immobilization occur between the sealing portion referred to and the housing flange engaged thereto, the present seal incorporates provisions enabling its operation to proceed with unimpaired efficiency. The remaining, radially extending portion of the diaphragm member seals against the nosepiece and shifts axially in unrestricted manner, with complete freedom, though in a controlled manner, notwithstanding the immobility referred to. The seal at the abutting surfaces of nosepiece and diaphragm is retained unbroken, whereas in another structure the immobilizing of the flexible sealing member would break or open this seal.

Referring to the drawings wherein a practical embodiment of the invention is illustrated, the reference numeral 10 generally designates the seal of the present invention, shown prior to assembly in Fig. 1 and in Fig. 2 in its operative assembled relation to a pair of relatively rotating parts, i. e., a housing 11, and a shaft 12. As illustrated, the seal has a fixed, preferably force-fit engagement with the housing. The reference numeral 13 designates a ring or other annular shoulder or abutment secured to shaft 12 with which the seal axially coacts. It will be readily appreciated, however, that the assembly might be reversed, the seal being carried by the shaft, and, in fact, any association of the seal with a pair of relatively rotating parts wherein the structural features of the former are applicable in the broadest sense of the invention is contemplated.

Referring to Fig. 1, seal 10 comprises a pair of outer and inner nested annular sheet metal casings or housing members 14, 15 respectively, the former being U-shaped in section and the latter being of L-section. Member 15 is nested within the member 14 and retained in said nested relation by an annular bead or lip 16 on the latter, spun around its outer peripheral edge. The remainder of the seal elements are contained within the members 14, 15 so as to constitute the seal an entirely self-contained unit, needing only to be assembled with the relatively rotatable parts 11 and 13 prior to operation. These components consist of an annular nose piece 17 of carbon, metal, leather, fiber or any other appropriate sealing material, the forward, annular face 18 of which is intended to have sliding engagement with the annular abutment 13 in the installed position of the seal.

The outer periphery of the nose piece 17 has slots or recesses 19 at spaced points for the reception of tongue-like lugs 20 which are slit and struck inwardly from the periphery of the inner casing member 15. These coacting lugs and recesses serve to prevent undesired relative rotation of the nose piece and casing.

Immediately rearwardly of the annular nose piece there is provided a flexible and resilient annular sealing member 21 of rubber, synthetic rubber or like resilient material. This member is shown in the illustrated embodiment to be of generally L-shaped section, with its base 21' in radially constrictive sealing engagement with the internal axial sleeve portion or flange 22 of casing member 14. Base 21' is of relatively thick, block-like character, as compared with the remainder of member 21. Member 21 further has an annular radial web 21" extending outwardly from base 21'. A coiled annular garter spring 23 seats in an annular groove which is formed in the base of the sealing member to receive the same, and functions to supplement the inherent resilience of the member in engaging the latter snugly against the flange 22. Only sufficient radial force is applied to produce snug sealing engagement, but not to prevent limited shifting of the base 21' axially of the flange in the normal operation of the seal. An axial thrust ring 24 is disposed rearwardly of the nose piece 17 and an outer peripheral portion of sealing member 21, for the purpose of applying uniform resilient thrust thereto from the spring means to be described. To this end ring 24 carries an integral internal and axially extending flange 24' which projects beneath an annular rear bead 25 on the periphery of web 21". Said bead and web terminate short of the periphery of nose piece 17, so that ring 24 serves to cup the bead and rear outer face of said nose piece in the flanged outline of the ring. This maintains the relative position of the nose piece and member 21 for axial movement as a unit in operation.

A split annular, undulatory or wave spring 26 completes the seal assembly. This spring is disposed to abut the rearward side of the ring 24, being preferably of only slightly less diameter than the internal periphery of casing member 15. At its opposite side said spring bears against the radial wall of casing member 14, hence acts through ring 24 to urge the outer portion of sealing member 21 and nose piece 17 to the right, as viewed in Figures 1 and 2.

In assembling the seal, for illustrative purposes in an association such as is shown in Fig. 2, the casing is force fitted in the housing 11, bringing the nose piece 17 into abutment with the annular shoulder 13 under sufficient axial force to shift the nose piece 17 and sealing element 21, including base 21' thereof, rearwardly, in opposition to the force of the wave spring 26 and notwithstanding the friction between member 21 and sleeve-like flange 22.

In normal operation the nose piece 17 will shift axially slightly as the sealing surface 18 thereof effects a relatively rotatable sealing engagement with the shoulder 13 on the shaft. This axial motion is normally transmitted directly to the base 21' of the diaphragm member 21, which shifts correspondingly. Indeed, this base or axially extending portion may shift axially a slight amount from time to time as the operation of the seal continues, under varying conditions of shaft alignment, running engagement at the sealing surfaces, etc., as well as upon installation. Even should the freedom of the base 21' to shift axially be restricted, as by freezing of the base to flange 22, due to the aforesaid "growing" or swelling of the material of the diaphragm in use, the radial diaphragm portion 21" will nevertheless continue to shift a sufficient amount to accommodate the axial movement of the nose piece 17 and axial operation of the latter will be unimpaired under the condition referred to. Yet an effective, unbroken seal is maintained between the nose piece and said radial portion.

In Fig. 2 I have attempted to illustrate, though necessarily the showing is exaggerated in degree, the novel functional relationship of the above described parts in the operation of the seal. Assuming that the seal is assembled appropriately in the housing in position for nose piece 17 to engage shaft shoulder 13, being depressed axially somewhat against the force of spring 26, and assuming that in certain conditions of operation the base 21' of the diaphragm member 21 has swollen so as to become immobilized on the flange 22, thereafter the axial motions of the nose piece 17 proceed unimpaired, notwithstanding said immobility. The radially extending portion 21" fans in the forward to rearward direction to accommodate such axial shifting of the nose piece as occurs in its running engagement with ring 13. The clearance space "A" shown in Fig. 2 illustrates in exaggerated degree a free travel space between the base 21' of the frozen sealing member and the nose piece 17 as the latter shifts during continued operation of the seal. Indeed, it may be that no actual separation of base 21' from the rear of nose piece 17 will occur at all, merely a decrease in the axial contact pressure therebetween. In any case the radially outermost portions of member 21 continue to follow the axial motion of the nose piece being urged against the same by spring 26 and maintaining a seal at the contacting surfaces.

It will be appreciated that this seal continuously maintains the efficiency of its sealing action from the date of installation throughout the life thereof, notwithstanding conditions arising in operation which would normally detract seriously from, or entirely prevent, satisfactory operation.

I claim:

1. A seal for use in conjunction with a pair of relatively rotatable parts, comprising an annular casing having an outer axially extending sleeve portion adapted for fixed association with one of the parts, a radially extending abutment portion and an inner axially extending sleeve portion, said portions being in fixed, sealed relation to one another to substantially seal the casing between said portions, an annular sealing member in said casing adapted to engage the other of said parts to effect a running seal therewith and subject to axial shifting during operation, a flexible diaphragm sealing element having an inner peripheral portion in normally relatively fixed but axially shiftable sealing relation to said inner axially extending sleeve portion of the casing and spaced substantially forwardly from said abutment portion, said element having a radially extending web in sealing engagement with said member and freely shiftable axially therewith in the operation thereof, and spring means engaging said abutment portion on the side of said diaphragm sealing element opposite said sealing member and in thrust transmitting relation to said member and said web to urge said member forwardly for sealing action, while yielding to permit said axial shifting movement of said sealing member irrespective of movement of said peripheral portion, said outer sleeve portion of said casing having an element in rigid, fixed relation thereto which is externally engageable with said annular sealing member in radially outwardly spaced relation to said inner casing sleeve portion to limit the forward axial position of the sealing member.

2. A seal for use in conjunction with a pair of relatively rotatable parts, comprising an annular casing having an outer axially extending sleeve portion adapted for fixed association with one of the parts, a radially extending abutment portion and an inner axially extending sleeve portion, said portions being in fixed, sealed relation to one another to substantially seal the casing between said portions, an annular sealing member in said casing adapted to engage the other of said parts to effect a running seal therewith, and subject to axial shifting during operation, a flexible diaphragm sealing element having an inner relatively thick, block-like peripheral portion in normally relatively fixed but axially shiftable sealing relation to said inner axially extending sleeve portion of the casing and spaced substantially forwardly from said abutment portion, said element having a radially extending web sealingly engaging said member and freely shiftable axially therewith in the operation thereof, spring means engaging said abutment portion on the side of said diaphragm sealing element opposite said sealing member and in thrust transmitting relation to said member and said web to urge the member forwardly for sealing action, while yielding to permit said axial shifting movement of said sealing member, and spring means radially engaging said diaphragm peripheral portion and effecting a snug sealing engagement thereof with the inner axially extending casing portion, said outer sleeve portion of said casing having an element in rigid, fixed relation thereto which is externally engageable with said annular sealing member in radially outwardly spaced relation to said inner casing sleeve portion to limit the forward axial position of the sealing member.

LOUIS G. KRUG.

REFERENCES CITED

The following references are of record in the file of this patent:

UNITED STATES PATENTS

| Number | Name | Date |
| --- | --- | --- |
| 1,795,546 | Evans | Mar. 10, 1931 |
| 2,289,659 | Kosatka | July 14, 1942 |
| 2,322,834 | Dornhofer | June 29, 1943 |
| 2,373,463 | Curtis | Apr. 10, 1945 |
| 2,385,420 | Meyer | Sept. 25, 1945 |
| 2,497,704 | Voytech | Feb. 14, 1950 |